United States Patent
Coleman et al.

(10) Patent No.: US 8,218,904 B2
(45) Date of Patent: Jul. 10, 2012

(54) METHOD AND SYSTEM FOR CIRCULAR TO HORIZONTAL TRANSPOSITION OF AN IMAGE

(75) Inventors: Chadwick M. Coleman, Owego, NY (US); Richard VanHall, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 839 days.

(21) Appl. No.: 12/198,982

(22) Filed: Aug. 27, 2008

(65) Prior Publication Data
US 2010/0054629 A1   Mar. 4, 2010

(51) Int. Cl.
*G06K 9/00* (2006.01)

(52) U.S. Cl. .......... 382/293; 348/95; 382/201; 382/295; 382/296; 702/95

(58) Field of Classification Search ........................ None
See application file for complete search history.

(56) References Cited

U.S. PATENT DOCUMENTS

| | | | |
|---|---|---|---|
| 3,701,098 A | 10/1972 | Acker | |
| 3,951,509 A | 4/1976 | Noguchi et al. | |
| 3,967,243 A | 6/1976 | Kawa | |
| 4,893,003 A | 1/1990 | Hays | |
| 4,922,543 A | 5/1990 | Ahlbom et al. | |
| 5,046,020 A | 9/1991 | Filkin | |
| 5,048,097 A | 9/1991 | Gaborski et al. | |
| 5,052,043 A | 9/1991 | Gaborski | |
| 5,054,094 A | 10/1991 | Barski | |
| 5,060,276 A | 10/1991 | Morris et al. | |
| 5,060,278 A | 10/1991 | Fukumizu | |
| 5,063,605 A * | 11/1991 | Samad ........................ 382/293 |
| 5,067,164 A | 11/1991 | Denker et al. | |
| 5,091,965 A | 2/1992 | Kobayashi et al. | |
| 5,093,899 A | 3/1992 | Hiraiwa | |
| 5,105,468 A | 4/1992 | Guyon et al. | |
| 5,119,438 A | 6/1992 | Ueda et al. | |
| 5,129,039 A | 7/1992 | Hiraiwa | |
| 5,157,738 A | 10/1992 | Carpenter et al. | |
| 5,161,204 A | 11/1992 | Hutcheson et al. | |
| 5,181,258 A | 1/1993 | Nagao et al. | |
| 5,214,746 A | 5/1993 | Fogel et al. | |

(Continued)

FOREIGN PATENT DOCUMENTS

JP          60235007          11/1985

(Continued)

OTHER PUBLICATIONS

Gonzalez, R. C. et al. (1977), "Image segmentation and description." Digital image processing, London: Addison-Wesley Publishing Company, pp. 320-348.

*Primary Examiner* — John Lee (74) *Attorney, Agent, or Firm* — Burns & Levinson LLP; Jacob N. Erlich; Orlando Lopez (57) ABSTRACT

A system and method for automatically transposing an image from a circular image space to another image space, for example, horizontal. Examples of applications include a mail piece a roundel on a mail piece. On a mail piece, company name, city and state, or zip code information can be contained in the roundel instead of, for example, in the permit block. The system implements the methods electronically. Control and data information is electronically executed and stored on computer-readable media.

19 Claims, 6 Drawing Sheets

U.S. PATENT DOCUMENTS

| | | | |
|---|---|---|---|
| 5,319,722 A | 6/1994 | Oki et al. | |
| 5,878,151 A * | 3/1999 | Tang et al. | 382/103 |
| 6,075,881 A * | 6/2000 | Foster et al. | 382/141 |
| 6,381,366 B1 | 4/2002 | Taycher et al. | |
| 6,687,402 B1 | 2/2004 | Taycher et al. | |
| 7,239,435 B2 | 7/2007 | Shahar | |
| 2005/0030321 A1 | 2/2005 | Anwar | |

FOREIGN PATENT DOCUMENTS

| | | |
|---|---|---|
| WO | 9308543 | 4/1993 |
| WO | WO 9308543 | 4/1993 |

* cited by examiner

METHOD AND SYSTEM FOR CIRCULAR TO HORIZONTAL TRANSPOSITION OF AN IMAGE

BACKGROUND

The system and method of the present embodiment relate generally to automatically transposing an image from a circular image space to a horizontal image space.

Figure 3A:
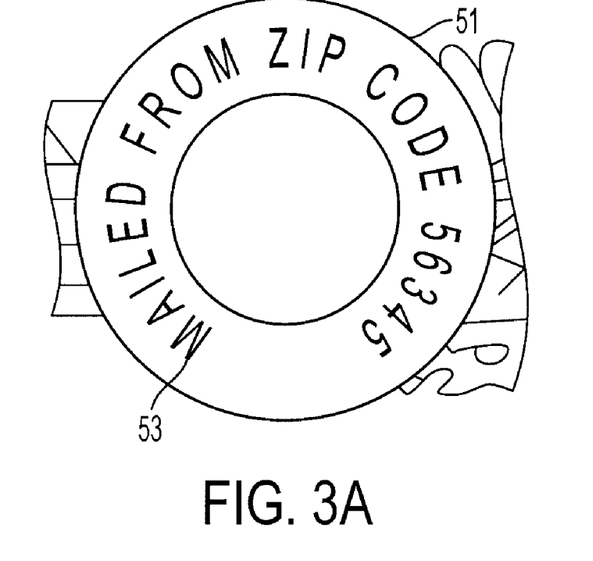
FIGS. 3A and 3B are examples of text in roundels.
Figure 3B:
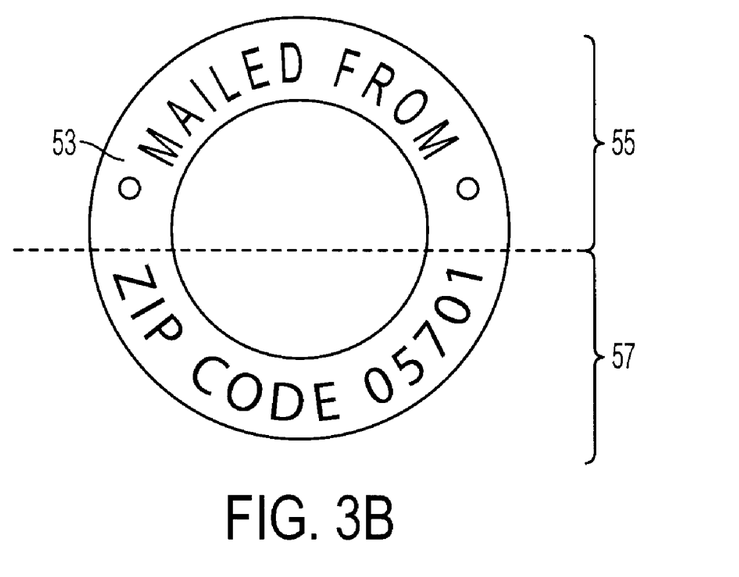

Electronically represented text can be oriented in various ways and, in some cases, parts of the text can be inverted in relation to other parts of the text. One situation in which this can occur is when text is located in a roundel, which is a circle containing text. On a mail piece, a roundel can be located, for example, to the left of a permit block and can contain, for example, text written along an inside edge of the roundel. Additionally, there can be another circle just inside the text. Company name, city and state, or zip code information can be contained in the roundel instead of, for example, in the permit block. Roundels can include, for example, text written in a circle (see FIG. 3A), and text oriented so that it is never upside-down to the reader (see FIG. 3B).

SUMMARY

The needs set forth above as well as further and other needs and advantages are addressed by the embodiments set forth below.

The present embodiment can automatically transpose a circular image to a horizontal image. The method of the present embodiment can include, but is not limited to including, the steps of choosing a starting pixel on the circumference of a circular image and choosing an end sampling pixel within the circular image. The method can also include the steps of computing the distance between the location of the starting pixel and location of the end sampling pixel, computing an angle based on the location of the starting pixel and the circumference of the circular image, and computing X and Y coordinates based on the center of the circular image, the angle, and the distance. The method can still further include the steps of copying a sample pixel located at the X and Y coordinates to a position in an image, for example, a horizontal or flattened image, that is based on where the sample pixel was sampled in the circular image, moving the sample point towards the end sampling pixel, and repeating the sampling steps until reaching the end sampling pixel. The method can even still further include the steps of moving to the next pixel along the circumference of the circular image and repeating the sampling steps as above until each pixel along the circumference has been visited, and storing the image in an electronic sink.

The system of the present embodiment can include, but is not limited to including, a pre-sampling processor for choosing a starting pixel on the circumference of a circular image and choosing an end sampling pixel within the circular image, computing the distance between the location of the starting pixel and location of the end sampling pixel, computing an angle based on the location of the starting pixel and the circumference of the circular image, and computing X and Y coordinates based on the center of the circular image, the angle, and the distance. The system can also include a sampler 23 for copying a sample pixel located at the X and Y coordinates to a position in an image, for example, a horizontal or flattened image, that is based on where the sample pixel was sampled in the circular image, moving the sample point towards the end sampling pixel, repeating the sampling steps until reaching the end sampling pixel, moving to the next pixel along the circumference of the circular image and repeating the sampling steps as above until each pixel along the circumference has been visited. The system can still further include an image creator for accessing the image and storing the image in an electronic sink.

For a better understanding of the present embodiments, together with other and further objects thereof, reference is made to the accompanying drawings and detailed description.

DETAILED DESCRIPTION

The present embodiments are now described more fully hereinafter with reference to the accompanying drawings. The following configuration description is presented for illustrative purposes only. Any computer configuration and architecture satisfying the speed and interface requirements herein described may be suitable for implementing the system and method of the present embodiments.

Figure 1:
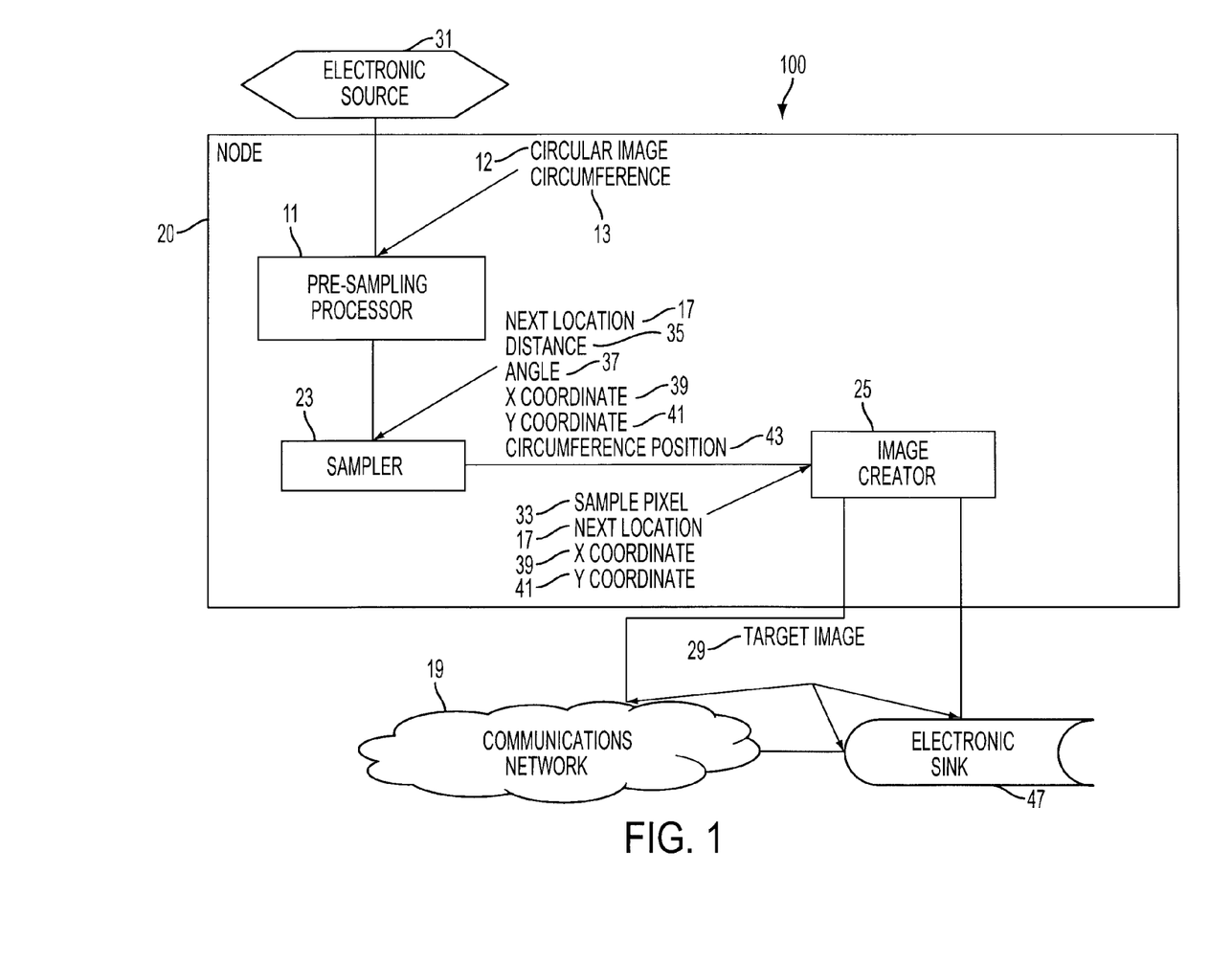
FIG. 1 is a schematic block diagram of the system of the present embodiment.
Figure 2:
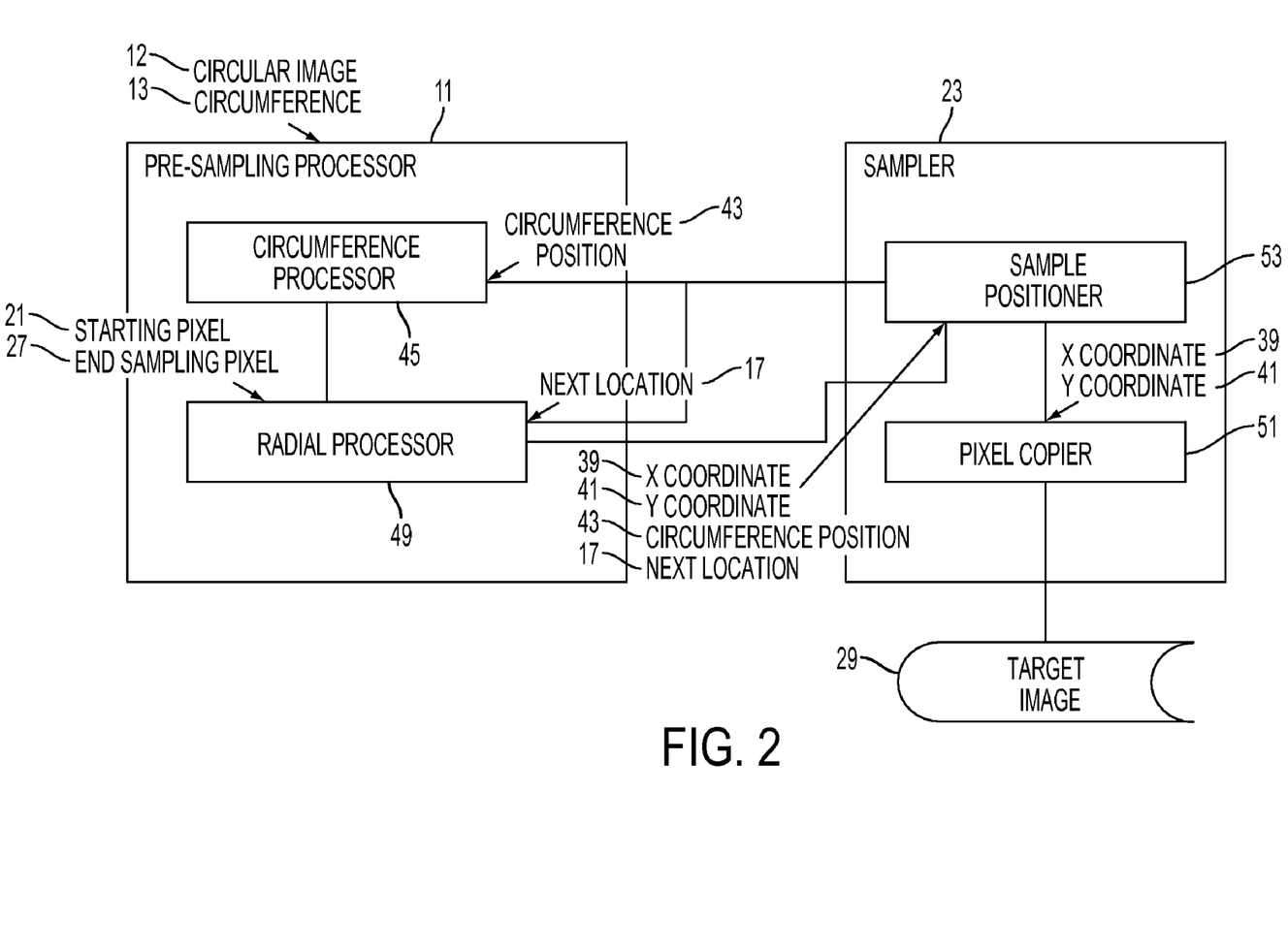
FIG. 2 is a schematic block diagram of the detail of a component of the system of the present embodiment.

Referring now to FIGS. 1 and 2, system 100 (FIG. 1) of the present embodiment can include, but is not limited to including, pre-sampling processor 11 (FIG. 1) for choosing starting pixel 21 (FIGS. 1 and 2) on circumference 13 (FIGS. 1 and 2) of circular image 12 (FIGS. 1 and 2), equating a starting location of starting pixel 21 (FIGS. 1 and 2) to circumference position 43 (FIGS. 1 and 2), equating circumference position 43 (FIGS. 1 and 2) to next location 17 (FIGS. 1 and 2), choosing end sampling pixel 27 (FIG. 2) within circular image 12 (FIGS. 1 and 2), computing distance 35 (FIG. 1) between next location 17 (FIGS. 1 and 2) and end sampling pixel 27 (FIG. 2), computing angle 37 (FIG. 1) based on next location 17 (FIGS. 1 and 2) and circumference 13 (FIGS. 1 and 2), computing X coordinate 39 (FIGS. 1 and 2) and Y coordinate 41 (FIGS. 1 and 2) based on the center of circular image 12 (FIGS. 1 and 2), angle 37 (FIG. 1), and distance 35 (FIG. 1). System 100 (FIG. 1) can further include sampler 23 (FIGS. 1 and 2) for copying sample pixel 33 (FIG. 1) located at X coordinate 39 (FIGS. 1 and 2) and Y coordinate 41 (FIGS. 1 and 2) to a position in target image 29 (FIGS. 1 and 2) that is based on circumference position 43 (FIGS. 1 and 2), X coordinate 39 (FIGS. 1 and 2), and Y coordinate 41 (FIGS. 1 and 2), modifying next location 17 (FIGS. 1 and 2), accessing pre-sampling processor 11 (FIGS. 1 and 2) until distance 35 (FIG. 1) is substantially zero, modifying circumference position 43 (FIGS. 1 and 2), accessing pre-sampling processor 11 (FIGS. 1 and 2) until the next circumference position 43 (FIGS. 1 and 2) is adjacent to the starting location. System 100 (FIGS. 1 and 2) can still further include an image creator 25 (FIG. 1) for accessing target image 29 (FIGS. 1 and 2) and storing target image 29 (FIGS. 1 and 2) in electronic sink 47 (FIG. 1). Image creator 25 (FIG. 1) can further equate the width of target image 29 (FIGS. 1 and 2) to circumference 13 (FIGS. 1 and 2), and equate the height of target image 29 (FIGS. 1 and 2) to the radius of circular image 12 (FIGS. 1 and 2). Circular image 12 (FIGS. 1 and 2) and circumference 13

(FIGS. 1 and 2) and be provided by electronic source 31 (FIG. 1), which can include, but is not limited to including, a scanner, keyboard input, or other means.

Referring now primarily to FIG. 2, sampler 23 can include, but is not limited to including, sample positioner 53 and pixel copier 51, and pre-sampling processor 11 can include, but is not limited to including circumference processor 45 and radial processor 49. Sample positioner 53 can compute angle 37 as $$\text{Angle } 37 = ((A*(360/C))*(\pi/180)) \quad (1)$$

A is the location of starting pixel 21 and C is circumference 13 of circular image 12. Sample positioner 53 can further define X coordinate 39 as $$X \text{ Coordinate } 39 = CP + (\sin(\text{Angle } 37)*D) \quad (2)$$

and define Y coordinate 41 as $$Y \text{ Coordinate } 41 = CP + (\cos(\text{Angle } 37)*D) \quad (3)$$

where CP is the center of circular image 12 and D is distance 35.

Continuing to refer to FIG. 2, optionally, sample positioner 53 can decrement next location 17 to move towards end sampling pixel 27. Sample positioner 53 can also optionally determine the pixel location of an adjacent pixel that is adjacent to circumference position 43, can set circumference position 43 to the pixel location, and can inform circumference processor 45 of the new value for circumference position 43. Sample positioner 53 can even further optionally compute the position in target image 29 as position (XF, YF), where XF, the image X coordinate, is equal to next location 17, and where YF, the image Y coordinate, is equal to the location at (X coordinate 39, Y coordinate 41). Optionally, end sampling pixel 27 can be the center of circular image 12. Radial processor 49 can decide how many points to sample in between starting pixel 21 and end sampling pixel 27 for each radial. Next location 17 falls on a pixel location because X coordinate 39 and Y coordinate 41 can be rounded to integer values after being calculated, for example, in floating point. Sampler 23 can sample grey, bilevel, and/or color pixels. Starting pixel 21 can lie outside circular image 12, and end sampling pixel 27 can lie inside a circle inside circular image 12, for example, if an inner circle exists, see FIGS. 3A and 3B. If there is no inner circle in, for example, a mail product, sampler 23 can sample the outer half of the radius (plus some padding on both sides). Sampler 23 can sample points that are one pixel apart on or near circumference 13 and work inwards on an imaginary line towards end sampling pixel 27. Thus, sometimes sampler 23 can sample the same pixel twice. Pixel copier 51 can store each sample pixel 33 (FIG. 1) in target image 29 at a certain location, thereby forming target image 29, as sampling proceeds. Target image 29 can contain grey, bilevel, and/or color output, without performing the step of binarization.

Figure 4A:
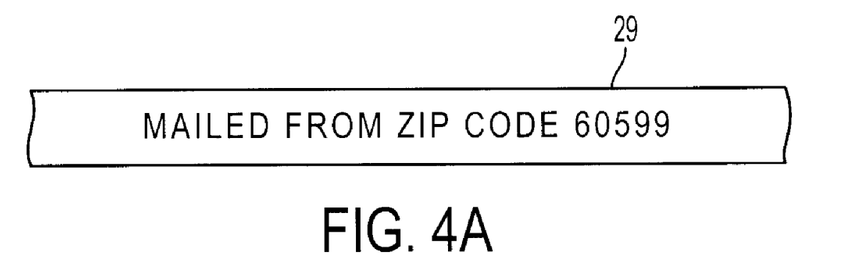
FIGS. 4A-4C are examples of text of various layouts, for example, flipped (FIG. 4B)
Figure 4B:
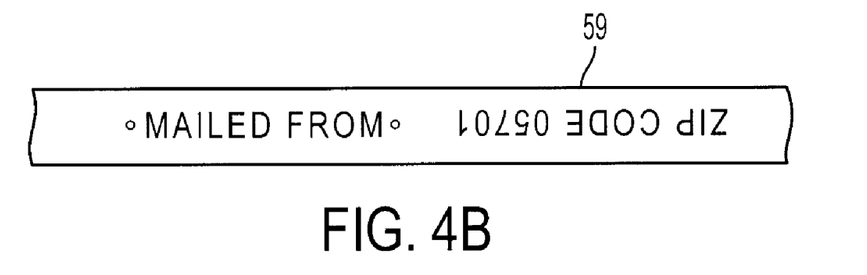
Figure 4C:
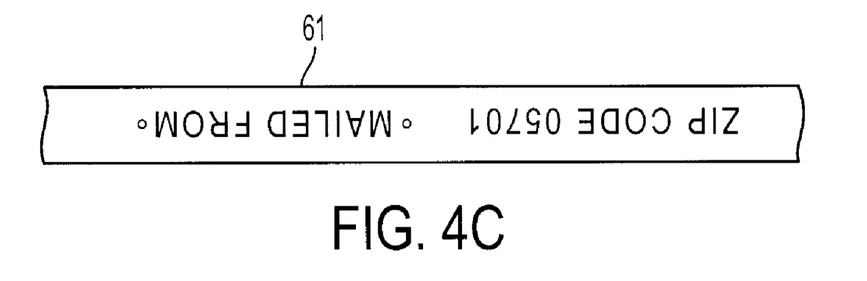

Referring to FIGS. 4A-4C, target image 29 (FIG. 4A) is shown after the conversion of method 150 (FIGS. 5A-5B) is complete. FIGS. 4B-4C illustrate half-flipped layout 59 FIG. 4B) and flipped layout 61 (FIG. 4C).

Figure 5A:
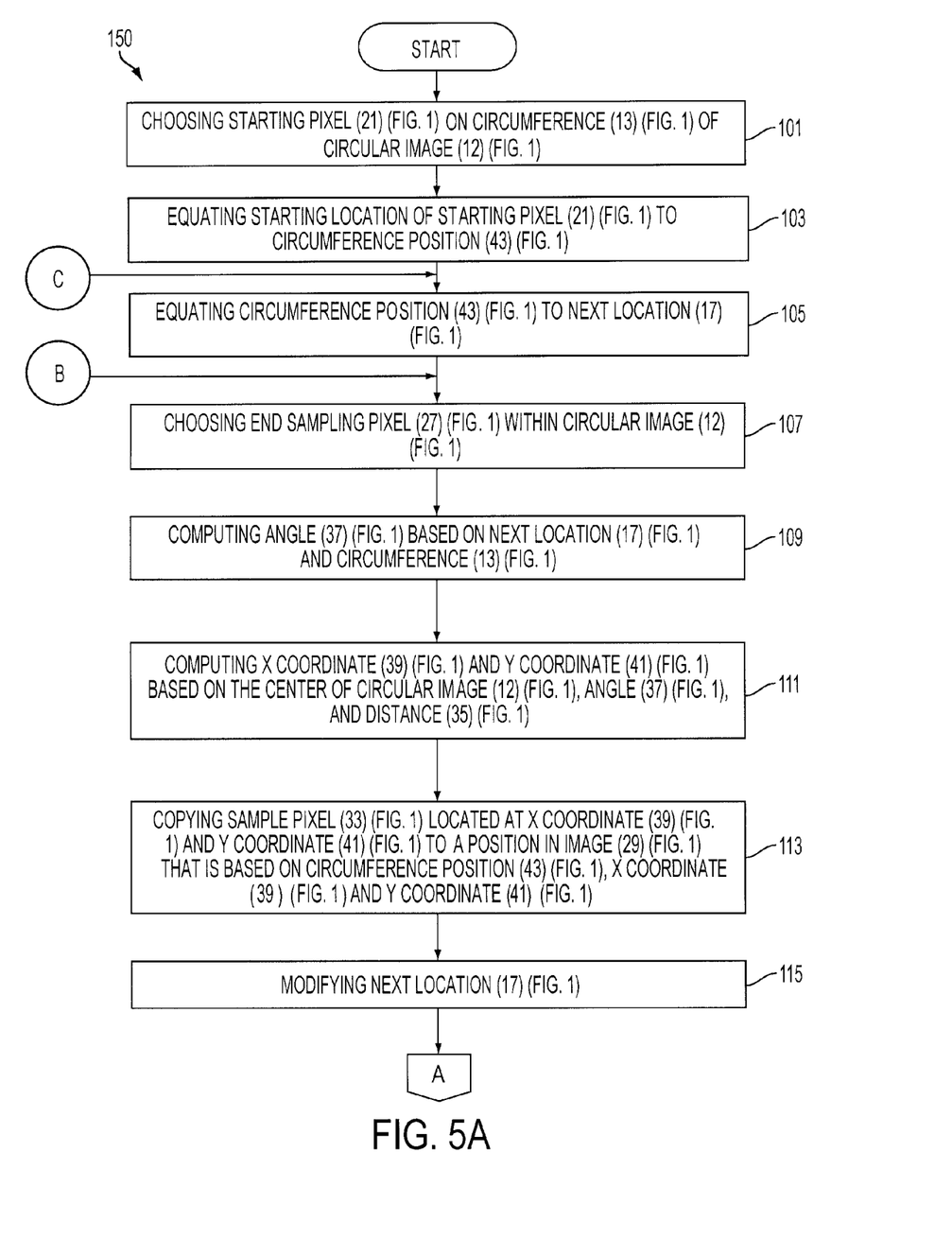
FIGS. 5A and 5B are flowcharts of a method of an embodiment according to the teachings stated herein.
Figure 5B:
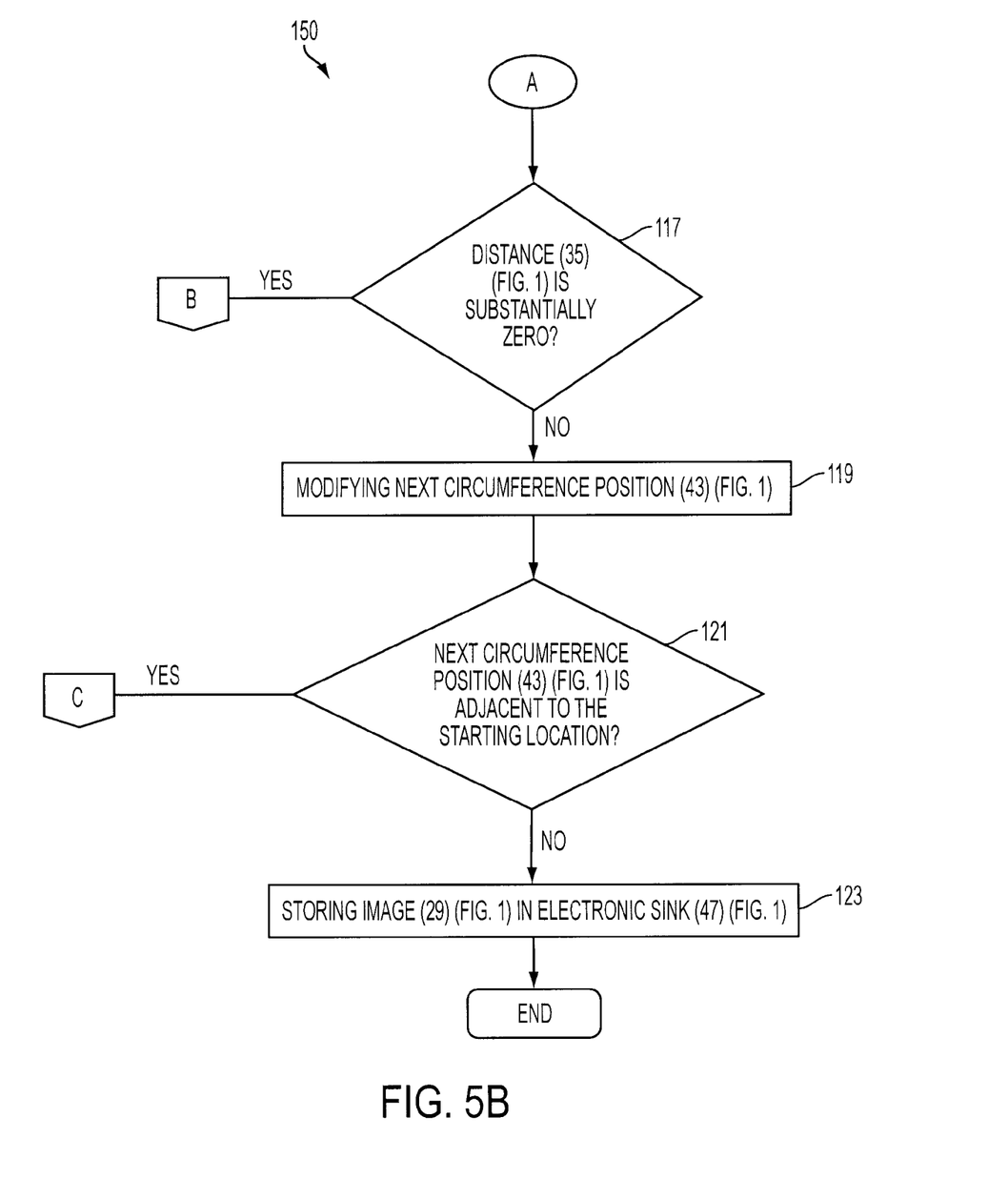

Referring now primarily to FIGS. 5A-5B, method 150 for automatically converting circular image 12 (FIG. 1) associated with circumference 13 (FIG. 1) to target image 29 (FIG. 1) can include, but is not limited to including, the steps of (a) choosing starting pixel 21 (FIG. 1) on circumference 13 (FIG. 1) of circular image 12 (FIG. 1); (b) equating starting location of starting pixel 21 (FIG. 1) to circumference position 43 (FIG. 1); (c) equating circumference position 43 (FIG. 1) to next location 17 (FIG. 1); (d) choosing end sampling pixel 27 (FIG. 2) within circular image 12 (FIG. 1); (e) computing distance 35 (FIG. 1) between next location 17 (FIG. 1) and end sampling pixel 27 (FIG. 2); (f) computing angle 37 (FIG. 1) based on next location 17 (FIG. 1) and circumference 13 (FIG. 1); (g) computing X coordinate 39 (FIG. 1) and Y coordinate 41 (FIG. 1) based on the center of circular image 12 (FIG. 1), angle 37 (FIG. 1), and distance 35 (FIG. 1); (h) copying sample pixel 33 (FIG. 1) located at X coordinate 39 (FIG. 1) and Y coordinate 41 (FIG. 1) to a position in target image 29 (FIG. 1) that is based on circumference position 43 (FIG. 1), X coordinate 39 (FIG. 1) and Y coordinate 41 (FIG. 1); (i) modifying next location 17 (FIG. 1); (j) repeating steps (d)-(i) until distance 35 (FIG. 1) is substantially zero; (k) modifying next circumference position 43 (FIG. 1); (l) repeating steps (c)-(k) until next circumference position 43 (FIG. 1) is adjacent to the starting location; and (m) storing target image 29 (FIG. 1) in electronic sink 47 (FIG. 1).

Referring now primarily to FIG. 1, method 150 (FIGS. 5A-5B) can optionally include the steps of equating the width of target image 29 (FIG. 1) to circumference 13 (FIG. 1) and equating the height of target image 29 (FIG. 1) to the radius of circular image 12 (FIG. 1). Method 150 (FIG. 5) can further optionally include the steps of computing angle 37 (FIG. 1) as Angle 37=((A*(360/C))*($\pi$/180)) wherein A=the location of starting pixel 21 (FIG. 1) and C=circumference 13 (FIG. 1) of circular image 12 (FIG. 1), defining X coordinate 39 (FIG. 1) as X Coordinate 39 (FIG. 1)=CP+(sin(Angle 37 (FIG. 1))*D), and defining Y coordinate 41 (FIG. 1) according to Y Coordinate 41 (FIG. 1)=CP+(cos(Angle 37 (FIG. 1))*D), wherein CP=the center of circular image 12 (FIG. 1) and D=distance 35 (FIG. 1). In method 150 (FIG. 5) end sampling pixel 27 (FIG. 2) can be equal to the center of circular image 12 (FIG. 1). Also, in method 150 (FIG. 5), the step of modifying distance 35 (FIG. 1) can include the step of decrementing distance 35 (FIG. 1), and the step of modifying circumference position 43 (FIG. 1) can include the steps of determining the pixel location of an adjacent pixel that is adjacent to circumference position 43 (FIG. 1) and setting circumference position 43 (FIG. 1) to the pixel location. Method 150 (FIG. 5) can further optionally include the step of computing the position in target image 29 (FIG. 1) as position (XF, YF), where XF, the image X coordinate,=circumference position 43 (FIG. 1), and where YF, the image Y coordinate,=(X coordinate 39 (FIG. 1), Y coordinate 41 (FIG. 1)).

The methods of the present embodiments can be, in whole or in part, implemented electronically. Signals representing actions taken by elements of system 100 (FIG. 1) can travel over electronic communications media. Control and data information can be electronically executed and stored on computer-readable media. The system can be implemented to execute on a node 20 in a communications network 19. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, and EPROM, a FLASH-EPROM, or any other memory chip or cartridge, a carrier wave, or any other medium from which a computer can read.

Although the teachings have been described with respect to various embodiments, it should be realized these teachings are also capable of a wide variety of further and other embodiments.

What is claimed is:

1. A processor implemented method for automatically converting a circular image associated with a circumference to a target image, steps of the method executed electronically and control and data information stored in non-transitory computer readable media, the method comprising the steps of:
   (a) choosing a starting pixel on the circumference of the circular image;
   (b) equating, using the processor, a starting location of the starting pixel to a circumference position;
   (c) equating, using the processor, the circumference position to a next location; the next location being a location of a pixel on the circumference, the location being used in steps d-h hereinbelow;
   (d) choosing, using the processor, an end sampling pixel within the circular image;
   (e) computing, using the processor, a distance between the next location and the end sampling pixel;
   (f) computing, using the processor, an angle based on the next location and the circumference;
   (g) computing, using the processor, an X coordinate and a Y coordinate based on the center of the circular image, the angle, and the distance;
   (h) copying, using the processor, a sample pixel located at the X coordinate and the Y coordinate to a position in a target image that is based on the circumference position, the X coordinate and the Y coordinate;
   (i) modifying, using the processor, the next location;
   (j) repeating steps (d)-(i) if the distance is not substantially zero and repeating steps (d)-(i) until the distance is substantially zero;
   (k) modifying, using the processor, the circumference position;
   (l) repeating steps (c)-(k) if the circumference position is not adjacent to the starting location and repeating steps (c)-(k) until the circumference position is adjacent to the starting location; and
   (m) storing the target image in an electronic sink;
   whereby image sources include an image in a mail piece; and whereby the circular image includes a roundel on a mail piece.

2. The method as in claim 1 further comprising the steps of:
   equating, using the processor, a width of the target image to the circumference; and
   equating, using the processor, a height of the target image to the radius of the circular image.

3. The method as in claim 1 further comprising the step of: computing the angle as $$\text{Angle}=((A*(360/C))*(\pi/180))$$

wherein A=the location of the starting pixel on the circumference, which is equated to the circumference position; and C=the circumference of the circular image.

4. The method as in claim 1 further comprising the steps of: defining the X coordinate as $$X\text{ Coordinate}=CP+(\sin(\text{Angle})*D);\text{ and}$$

defining the Y coordinate according to $$Y\text{ Coordinate}=CP+(\cos(\text{Angle})*D),$$

wherein CP=the center of the circular image and D=the distance.

5. The method as in claim 1 wherein the end sampling pixel is equal to the center of the circular image.

6. The method as in claim 1 wherein said step of modifying the distance comprises the step of:
   decrementing the distance.

7. The method as in claim 1 wherein said step of modifying the circumference position comprises the step of:
   determining the pixel location of an adjacent pixel that is adjacent to the circumference position; and
   setting the circumference position to the pixel location.

8. The method as in claim 1 further comprising the step of:
   computing the position in the target image as position (XF, YF),
   wherein XF, the image X coordinate,=the next location, and
   wherein YF, the image Y coordinate,=(X coordinate, Y coordinate).

9. A system for automatically converting a circular image associated with a circumference to a target image comprising:
   a pre-sampling processor for choosing a starting pixel on the circumference of the circular image;
      equating a starting location of said starting pixel to a circumference position;
      equating said circumference position to a next location; said next location being a location of a pixel on the circumference, the location being used in steps of choosing and computing hereinbelow;
      choosing an end sampling pixel within the circular image;
      computing a distance between said next location and said end sampling pixel;
      computing an angle based on said next location and the circumference;
      computing an X coordinate and a Y coordinate based on the center of the circular image, said angle, and said distance;
   a sampler for
      copying a sample pixel located at said X coordinate and said Y coordinate to a position in a target image that is based on said next location, said X coordinate and said Y coordinate;
      modifying said next location;
      accessing said pre-sampling processor until said distance is substantially zero;
      modifying said circumference position;
      accessing said pre-sampling processor until said circumference position is adjacent to said starting location; and
   an image creator for
      accessing the target image; and
      storing the target image in an electronic sink; said sampler and image creator comprising one or more processors.

10. The system as in claim 9 wherein said image creator further:
    equates the width of the target image to the circumference; and
    equates the height of the target image to the radius of the circular image.

11. The system as in claim 9 wherein said sampler further: computes said angle as $$\text{Angle}=((A*(360/C))*(\pi/180))$$

wherein A=the location of said starting pixel on the circumference, which is equated to the circumference position; and C=the circumference of the circular image.

12. The system as in claim 9 wherein said sampler further: defines said X coordinate as $$X\text{ Coordinate}=CP+(\sin(\text{Angle})*D);\text{ and}$$

defines said Y coordinate as $$Y\text{ Coordinate}=CP+(\cos(\text{Angle})*D),$$

wherein CP=the center of the circular image and D=said distance.

13. The system as in claim 9 wherein said end sampling pixel is equal to the center of the circular image.

14. The system as in claim 9 wherein said sampler further: decrements said next location.

15. The system as in claim 9 wherein said sampler further: determines the pixel location of an adjacent pixel that is adjacent to said circumference position; and
sets said circumference position to the pixel location.

16. The system as in claim 9 wherein said sampler further: computes the position in the target image as
position (XF, YF), wherein XF, said image X coordinate,=said next location, and wherein YF, said image Y coordinate,=(said X coordinate, said Y coordinate).

17. A node in a communications network for carrying out the method of claim 1.

18. A communications network having at least one node for carrying out the method of claim 1.

19. A non-transitory computer-readable medium having instructions for carrying out the method of claim 1.

* * * * *